United States Patent
Casey et al.

(10) Patent No.: US 6,371,882 B1
(45) Date of Patent: Apr. 16, 2002

(54) CONTROL SYSTEM AND METHOD FOR A MULTIPLE RANGE CONTINUOUSLY VARIABLE TRANSMISSION USING MECHANICAL CLUTCHES

(75) Inventors: Kent A. Casey, Washington; Ron L. Satzler, Princeville; Eric D. Stemler, Peoria, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/465,710

(22) Filed: Dec. 17, 1999

(51) Int. Cl.[7] .................................................. F16H 3/72
(52) U.S. Cl. ................................... 477/5; 475/2; 475/5
(58) Field of Search ............................ 475/1, 2, 5, 153; 477/3, 5, 123, 124; 180/65.2; 74/336 R

(56) References Cited

U.S. PATENT DOCUMENTS

| | | | |
|---|---|---|---|
| 3,478,851 A | * 11/1969 | Smyth et al. ................ 74/339 |
| H398 H | 1/1988 | Lemieux et al. |
| 4,838,126 A | 6/1989 | Wilfinger et al. ............ 477/129 |
| 5,030,179 A | 7/1991 | Ganoung ..................... 475/50 |
| 5,044,214 A | 9/1991 | Barber, Jr. .................. 475/216 |
| 5,337,848 A | * 8/1994 | Bader ........................ 180/65.2 |
| 5,440,945 A | 8/1995 | Penn ........................... 74/117 |
| 5,508,916 A | * 4/1996 | Markyvech et al. ...... 74/339 X |
| 5,558,588 A | 9/1996 | Schmidt ...................... 475/5 |
| 5,558,589 A | 9/1996 | Schmidt ...................... 475/5 |
| 5,558,595 A | 9/1996 | Schmidt et al. ............. 477/3 |
| 5,560,249 A | * 10/1996 | Nellums .................... 477/3 X |
| 5,571,058 A | 11/1996 | Schmidt ...................... 475/5 |
| 5,573,477 A | * 11/1996 | Desautels et al. ........... 477/109 |
| 5,577,973 A | 11/1996 | Schmidt ...................... 475/5 |
| 5,601,509 A | 2/1997 | Munoz ........................ 476/53 |
| 5,603,671 A | 2/1997 | Schmidt ...................... 475/5 |
| 5,607,372 A | 3/1997 | Lohr ........................... 475/216 |
| 5,682,315 A | 10/1997 | Coutant et al. .............. 701/57 |
| 5,730,676 A | * 3/1998 | Schmidt ...................... 475/5 |
| 5,842,144 A | 11/1998 | Coutant et al. .............. 701/62 |
| 5,916,050 A | * 6/1999 | Coutant et al. .............. 475/5 |
| 5,980,410 A | * 11/1999 | Stemler et al. .............. 475/5 |

FOREIGN PATENT DOCUMENTS

EP          458435 B1          8/1995

* cited by examiner

Primary Examiner—Charles A Marmor
Assistant Examiner—Ankur Parekh
(74) Attorney, Agent, or Firm—Haverstock, Garrett & Roberts

(57) ABSTRACT

The control system and method includes a plurality of clutch actuators adapted to be connected to clutches disposed for connecting members of the transmission to an input or output, respectively; first and second electrical motor/generators connected to respective members of the transmission and operable in a motor mode for controllably rotating the members and in a generator mode controllably rotated by the members to generate electrical energy; a sensor for sensing a speed representative of a rotational speed of the input or output; and a processor operably connected to the sensor, the motor/generators and the clutch actuators, the processor being operable for operating one of the motor/generators in the generator mode while operating another of the motor/generators in the motor mode powered by the one of the motor/generators so as to controllably rotate selected of the members of the transmission at speeds corresponding to a sensed rotational speed of the input or output for disconnecting one of the selected members from the input or output and connecting another of the selected members to the input or output.

27 Claims, 3 Drawing Sheets

CONTROL SYSTEM AND METHOD FOR A MULTIPLE RANGE CONTINUOUSLY VARIABLE TRANSMISSION USING MECHANICAL CLUTCHES

TECHNICAL FIELD

This invention relates generally to a control system and method for a continuously variable transmission, and more particularly, to an electronic control system and method for a multiple range continuously variable transmission, which system and method includes electrical motors/generators precisely controllable for rotating members of the transmission at speeds corresponding to rotational speeds of an input or output connecting the members to and disconnecting the members from the input or output using mechanical clutches.

BACKGROUND ART

In a machine, such as a wheel loader or a track type tractor, for example, an engine supplies power for propelling the machine in the forward and reverse directions, and for powering machine implements. A transmission is coupled to the engine and transmits power from the engine to the drive train to propel the machine. It is desirable to utilize a continuously variable transmission and manage the transmission ratio to save engine power for the implements and also to provide a continuously variable power flow through the transmission to improve machine productivity. Because machines operate at relatively low speeds and in cyclical work routines, there is a need to control speed precisely and for the speed to be infinitely adjustable throughout the ranges of the transmission. Changing or shifting the range involves engaging one clutch at near synchronous speed and disengaging another clutch, and it is desirable to make the range change without interrupting the torque or rate of ratio change in the transmission.

Many known transmissions use an electronically controlled hydraulic system for varying the ratio within a range, and frictional clutches instead of mechanical clutches for changing range. Although mechanical clutches are typically more efficient, they can suffer from a shortcoming known as a "four square" lockup. Lockup is typically due to an inherent slow response of the hydraulic system to electronic control signals. When a lockup occurs, the hydraulic system usually must be dithered, resulting in a noticeable delay in range change.

Thus, it is desired to provide an electrical alternative to the known hydraulic systems for continuously variable transmission which allows use of the more efficient mechanical clutches, but which avoids the lockup problems and operational delays associated therewith.

Accordingly, the present invention is directed to overcoming one or more of the problems as set forth above.

DISCLOSURE OF THE INVENTION

According to one aspect of the invention, an electronic control system for a continuously variable transmission is disclosed. The control system includes a plurality of clutch actuators adapted to be connected to clutches disposed for connecting members of the transmission to an input or output, respectively, the clutch actuators each being operable for respectively engaging corresponding of the clutches for selectably connecting the members to the input or output and disengaging the clutches for selectably disconnecting the members. The control system includes a first electrical motor/generator connected to a member of the transmission and operable in a motor mode for controllably rotating the member and in a generator mode controllably rotated by the member to generate electrical energy, a second electrical motor/generator connected to another member of the transmission and operable in a motor mode for controllably rotating that member and in a generator mode controllably rotated by that member while generating electrical energy, and a conductive path connecting the first and second motor/generators. The control system includes a sensor for sensing a speed representative of a rotational speed of the input or output, and a processor operably connected to the sensor, the motor/generators and the clutch actuators, the processor being operable for operating one of the motor/generators in the generator mode while operating another of the motor/generators in the motor mode powered by the one of the motor/generators so as to controllably rotate selected of the members of the transmission at speeds corresponding to a sensed rotational speed of the input or output for disconnecting one of the selected members from the input or output and connecting another of the selected members to the input or output.

In another aspect of this invention a method for operatively connecting components of a control system for a continuously variable transmission is disclosed. The method includes the steps of selectably connecting members of the transmission to an input or output of the transmission, utilizing a plurality of clutches adapted to be connected to a plurality of clutch actuators, the clutch actuators each being operable for respectively engaging corresponding of the clutches for connecting the members to the input or output of the transmission and disengaging the clutches for disconnecting the members therefrom, connecting a first electrical motor/generator to a member of the transmission and operable in a motor mode for controllably rotating the member and in a generator mode controllably rotated by the member to generate electrical energy, adaptively connecting a second electrical motor/generator to another member of the transmission and operable in a motor mode for controllably rotating the another member and in a generator mode controllably rotated by the another member while generating electrical energy, connecting a conductive path between the first and the second motor/generators, a sensor for sensing a speed representative of a rotational speed of the input or output of the transmission, and operably connecting a processor to the sensor, the motor/generators and the clutch actuators, the processor being operable for operating one of the motor/generators in the generator mode while operating another of the motor/generators in the motor mode powered by the one of the motor/generators such that selected of the members of the transmission are rotated at controlled speeds corresponding to a sensed rotational speed of the input or output of the transmission for disconnecting one of the selected members from the input or output of the transmission and connecting another of the selected members to the input or output of the transmission.

BEST MODE FOR CARRYING OUT THE INVENTION

Figure 1:
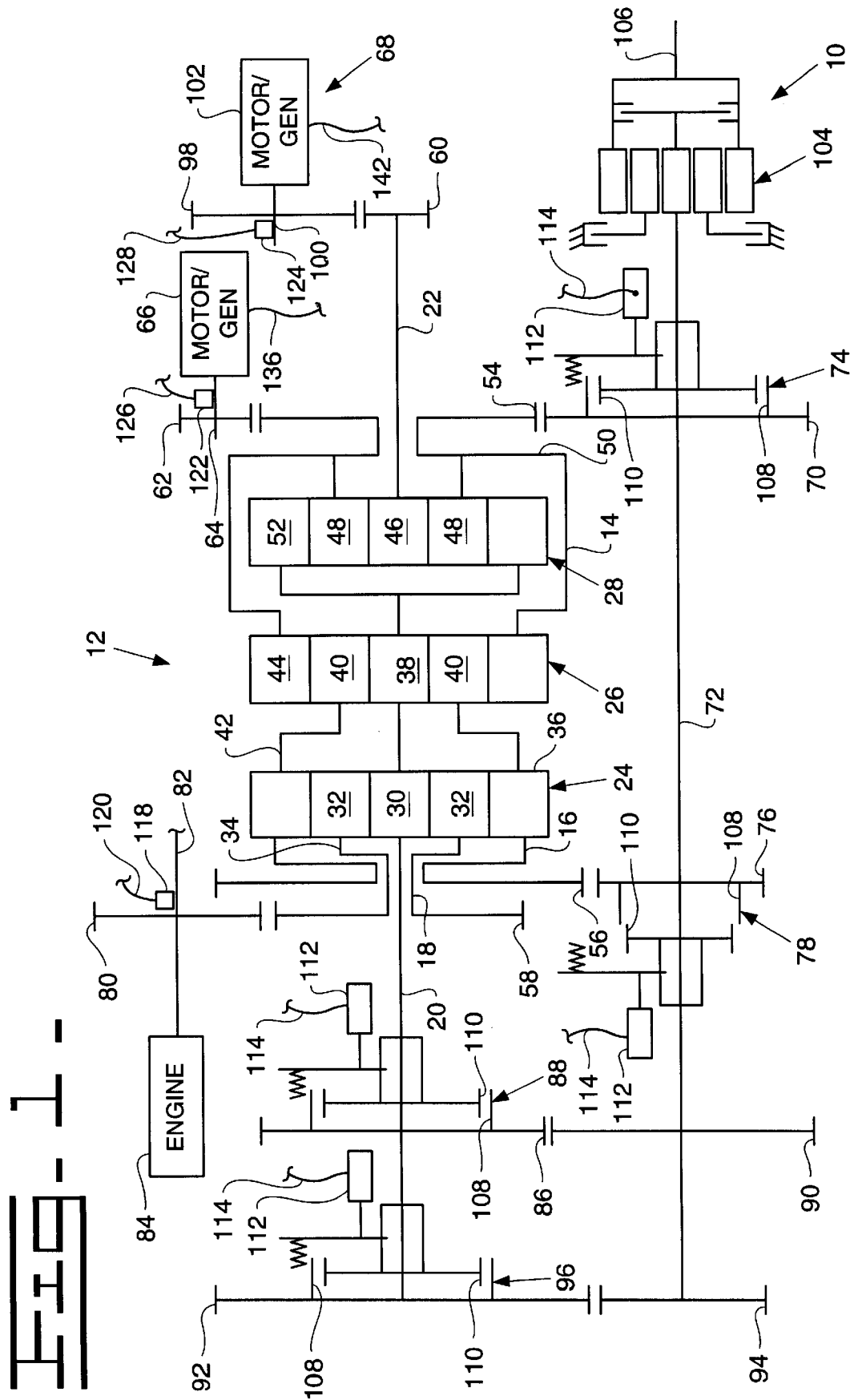
FIG. 1 is a schematic view of a transmission including elements of a control system according to the present invention.

Referring to FIG. 1, a multiple range continuously variable transmission 10 is shown. The transmission 10 is used to propel a machine, not shown. Transmission 10 includes a planetary gearing mechanism 12, a first member 14, a second member 16, a third member 18, a fourth member 20, and a fifth member 22. Planetary gearing mechanism 12 includes a first planetary gear set 24, a second planetary gear set 26 and a third planetary gear set 28. Each planetary gear set 24, 26 and 28 includes elements such as a sun gear, a carrier with planet gears, and a ring gear. First planetary gear set 24 includes a sun gear 30 enmeshed with a plurality of planet gears 32 mounted for rotation on a carrier 34 and enmeshed with a ring gear 36. Second planetary gear set 26 includes a sun gear 38 enmeshed with a plurality of planet gears 40 mounted for rotation on a carrier 42 and enmeshed with a ring gear 44. Third planetary gear set 28 includes a sun gear 46 enmeshed with a plurality of planet gears 48 mounted for rotation on a carrier 50 and enmeshed with a ring gear 52.

Here, it should be understood that transmission 10 can be configured differently so as to include fewer or greater numbers of gearing arrangements without departing from the scope of the present invention.

First member 14 of transmission 10 includes carrier 50, ring gear 44 of second planetary gear set 26, and a gear 54 mounted for rotation therewith. Second member 16 of transmission 10 includes ring gear 36 of first planetary gear set 24, carrier 42 of second planetary gear set 26 and a gear 56 mounted thereto for rotation therewith. Third member 18 of transmission 10 includes carrier 34 of first planetary gear set 24 and a gear 58 mounted thereto. Fourth member 20 includes sun gears 30 and 38 of first and second planetary gear sets 24 and 26, and ring gear 52 of third planetary gear set 28. Fifth member 22 includes sun gear 46 of third planetary gear set 28 and an attached gear 60.

Here, it should be recognized and understood that although members 14, 16, 18, 20 and 22 are identified with various specific elements of planetary gearing mechanism 12, such members could likewise include other or different elements of transmission 10 and/or mechanism 12 without departing from the present invention.

Gear 54 of first member 14 is enmeshed with a gear 62 on a shaft 64 of a first electrical motor/generator 66 of the present invention. Gear 54 is also enmeshed with a gear 70 selectably connectable to an intermediate output shaft 72 by a first mechanical clutch 74. Gear 56 of second member 16 of transmission 10 is enmeshed with a gear 76 selectably connectable to intermediate output shaft 72 by a third mechanical clutch 78. Gear 58 of third member 18 of transmission 10 is enmeshed with a gear 80 on an output shaft 82 of an engine 84 of the machine. Fourth member 20 is selectably connectable to a gear 86 by a second mechanical clutch 88, gear 86 being enmeshed with a gear 90 on intermediate output shaft 72. Fourth member 20 is also selectably connectable to a gear 92 enmeshed with a smaller gear 94 on intermediate output shaft 72 by a fourth mechanical clutch 96. Gear 60 of fifth member 22 is enmeshed with a gear 98 on a shaft 100 of a second electrical motor/generator 102.

Transmission 10 additionally includes a directional control mechanism 104 controllably operable for connecting intermediate output shaft 72 to an output 106 for rotating output 106 in a forward direction, or a reverse direction, as desired.

Each of the mechanical clutches 74, 78, 88 and 96 is of conventional construction and includes an internal splined element 108 adapted for matingly receiving an external splined element 110 for joint rotation, and an actuator 112 operable for inserting external splined element 110 into internal splined element 108. Here, it should be understood that a wide variety of clutch constructions, including other mechanical clutches and frictional clutches, could be used with transmission 10, as desired without departing from the present invention.

Figure 2:
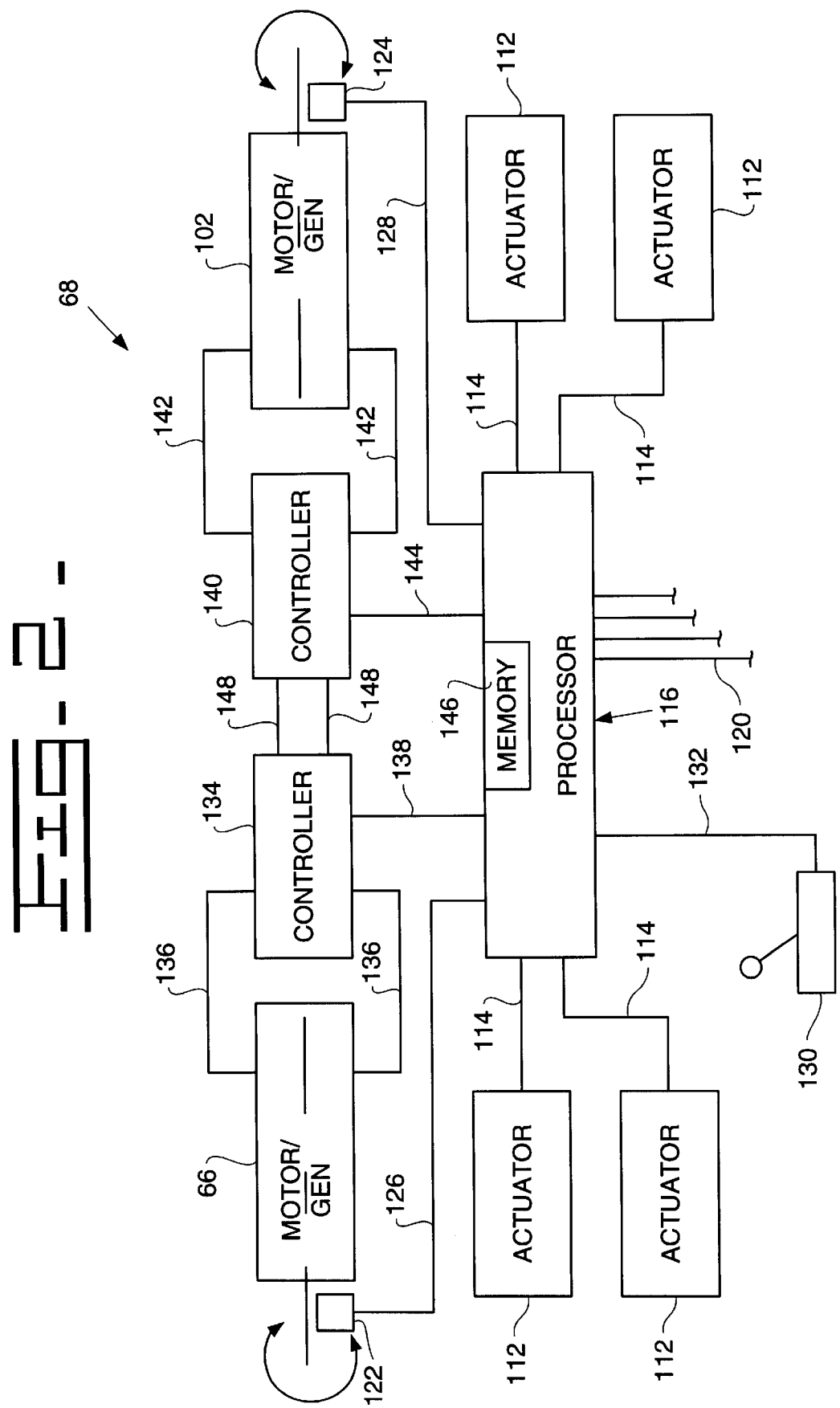
FIG. 2 is a block diagram of the present control system.

Referring also to FIG. 2, additional aspects of control system 68 are shown. In particular, each of the actuators 112 of clutches 74, 78, 88 and 96 is connected by a conductive path 114 to a processor 116 of control system 68. Control system 68 additionally includes a speed sensor 118 (FIG. 1) positioned for determining the rotational speed of shaft 82 of engine 84, connected by a conductive path 120 to processor 116, and speed sensors 122 and 124 for determining the rotational speeds of motors/generators 66 and 102, respectively, sensors 122 and 124 being connected to processor 116 by conductive paths 126 and 128. Since shaft 82 is connected to the third member 18, motor/generators 66 and 102 are connected to first and fifth members 14 and 22, respectively, and the ratios of the planetaries and the other gears of transmission 10 are known, the speed of any of the remaining members of transmission 10 and of any of the elements 108, 110 of clutches 74, 78, 88 and 96 can be determined when the speeds of shaft 82 and motor/generators 66, 102 are known.

System 68 includes an operator input 130, e.g., speed control, shiftable between positions representing the speed ranges for transmission 10 connected to processor 116 by a conductive path 132. Control system 68 includes a first motor/generator controller 134 connected to first electrical motor/generator 66 by a conductive path 136 and to processor 116 by a conductive path 138, and a second motor generator/controller 140 connected to second electrical motor/generator 102 by a conductive path 142 and to processor 116 by a conductive path 144.

Processor 116 includes a memory-type device 146 which contains a stored map or look-up table including corresponding speeds of shaft 82, generator/motors 66 and 102, respectively, and intermediate output shaft 72 with the respective clutches 74, 78, 88 and 96 engaged, such that generator/motors 66 and 102 can be alternately operated in a generator mode rotated by the member 14, 22 connected thereto for controlling the rotation of the member while also generating electrical energy, and in a motor mode powered at least in part by the generated energy for controllably rotating the member 14, 22 connected to that motor/generator. In this way, using a suitable algorithm, the speeds of the members 14, 22 connected to the respective motor/generators 66, 102 can be adjusted to substantially equalize the speeds of the elements 108, 110 of a selected clutch 74, 78, 88 or 96 to be engaged, while at the same time equalizing the speed and/or torque acting on the elements 108, 110 of an already engaged clutch 74, 78, 88 or 96, to allow the first named clutch 74, 78, 88 or 96 to be engaged and the second named clutch 74, 78, 88 or 96 to be disengaged. Motor/generators 66, 102 are connected in electrical communication via controllers 134, 140 by conductive path 148 to facilitate transfer of the electrical energy between the motor/generators.

Figure 3:
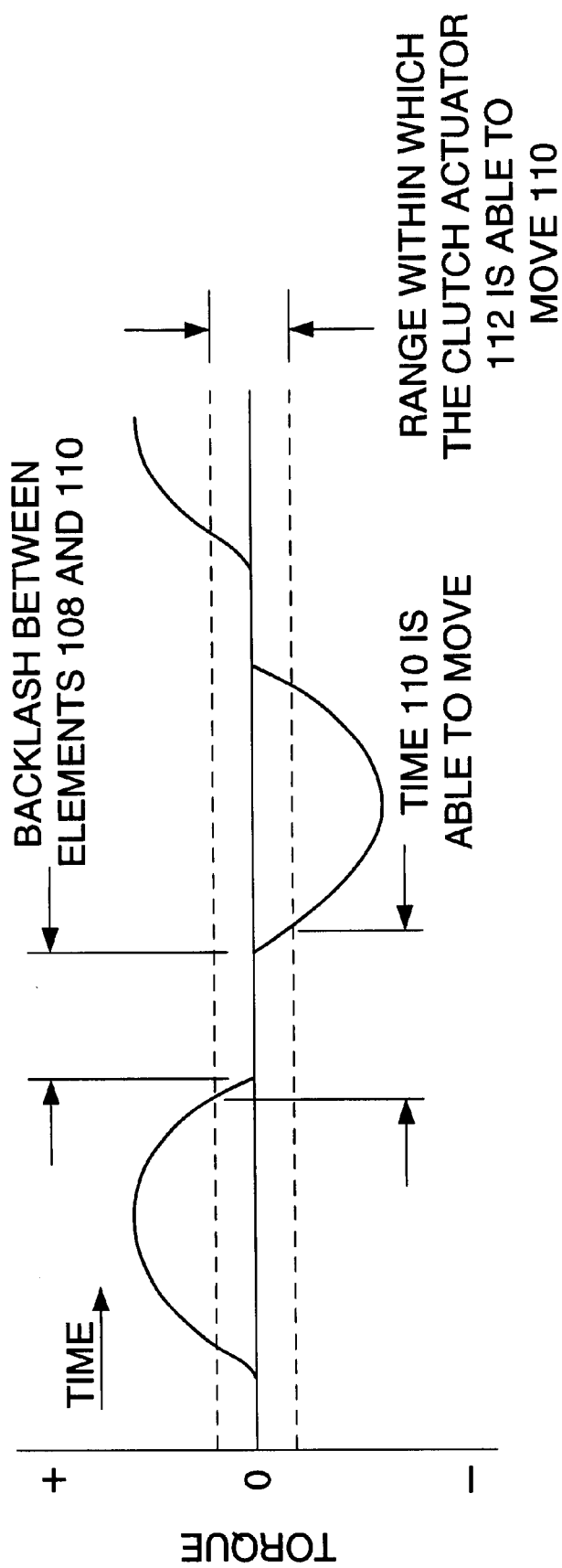
FIG. 3 is a graphical representation of torque verses time for a member of the transmission being disconnected from an output.

Referring to FIG. 3, to facilitate disengagement of an engaged clutch 74, 78, 88 or 96, motor/generators 66, 102 can be controllably operated to dither the transmission member associated with the engaged clutch. Dither is caused by the control system attempting to alternatively vary the speed of element 110 relative to element 108. Relative speed between element 108 and element 110 in a partially or fully engaged clutch can occur only if there is backlash in the clutch.

More specifically, after the control system has determined that synchronous speed exists between element 108 and element 110, actuator 112 attempts to fully engage element 110 into element 108. Once successful, a feedback signal from actuator 112 proceeds to processor 116. Simultaneous with the signal from actuator 112 a dither routine is initiated. Controllers 134, 140, and processor 116 work together to extremely rapidly vary the currents and or voltages to motor/generator units 66 and 102. These variations in voltages and or currents are designed to cause the motor/generator units 66 and 102 to attempt to change their speed ratio one to the other. The electrical motor/generator units 66, 102 react to their respective inputs from controllers 134, 140 very rapidly; about 0.001 seconds. This is much more rapid than hydraulic pump/motor units respond to electrical input signals. Generally, because both clutches involved in the range change are partially or fully engaged, a speed ratio change between units 66 and 102 cannot happen except for backlash in the clutch being actuated and other backlash in the system. A small change in the speed ratio between motor/generator units 66, 102 does occur in the backlash. This initiates the relative speed change between clutch parts 108 and 110 only during backlash. When the backlash is taken up, the speed ratio of units 66, 102 is torsionally forced to revert to their speed ratio at synchronous speed of 108 and 110 even though the controllers 134, 142 are calling for a different speed ratio. Since the speed ratio of units 66, 102 is then restrained, units 66, 102 react to the electrical signal from controllers 134, 142 with a change in torque. During the time the torque in the engaging clutch is within a certain low value range, the actuator 112 is able to further engage the clutch, as shown in FIG. 3. Notably, the greater the backlash the less the number of dither cycles required because the actuator 112 has more time opportunity to move 110 into engagement. Once the clutch is fully engaged, the process is repeated to disengage the dropout clutch.

INDUSTRIAL APPLICABILITY

In view of the foregoing, it is readily apparent that the electronic control system for a multiple range continuously variable transmission of the present invention has utility for a wide variety of transmissions for machines such as, but not limited to, a wheel loader or a track type tractor, to allow use of more efficient mechanical clutches and the like.

Other aspects, objects and advantages of this invention can be obtained from a study of the drawings, the disclosure and the appended claims.

What is claimed is:

1. A control system for a continuously variable transmission having a plurality of force transfer members and a plurality of mechanical clutches each associated with one or more of the members and each disposed for selectively connecting and disconnecting the associated member to an input or output of the transmission, the control system comprising:

a plurality of clutch actuators, each adapted to be connected to at least one of the mechanical clutches and each being operable for engaging and disengaging said one of the clutches for, respectively, connecting and disconnecting at least one of the members to the input or output of the transmission;

a first electrical motor/generator connected to a first member of the transmission and operable in a motor mode for controllably rotating the first member and in a generator mode for being controllably rotated by the first member to generate electrical energy, said first motor/generator having a speed adjustment significantly faster than that typical of a hydraulic pump/motor;

a second electrical motor/generator adapted to be connected to a second member of the transmission and operable in a motor mode for controllably rotating the second member and in a generator mode controllably rotated by the second member while generating electrical energy said second motor/generator having a speed adjustment significantly faster than that typical of a hydraulic pump/motor;

a conductive path connecting said first and second motor/generators;

a sensor for sensing a parameter representative of a rotational speed of the input or output of the transmission; and a processor operably connected to said sensor, said motor/generators and said clutch actuators, said processor being operable for operating one of said motor/generators in said generator mode while operating another of said motor/generators in said motor mode powered by said one of said motor/generators such that selected members of the transmission are rotated at adjustably controlled speeds corresponding to said sensed parameter for disconnecting one of the selected members from the input or output of the transmission and connecting another of the selected members to the input or output of the transmission, said processor operable for dithering the torque for facilitating disconnection of the one member, whereby said processor is adapted to rapidly adjust the speed of the motor/generators to produce adjustments to said controlled speeds of said selected members significantly faster than a typical response time of a hydraulic pump/motor so as to significantly reduce mechanical clutch engagement time.

2. The control system of claim 1, further including at least four of the clutch actuators.

3. The control system of claim 2, wherein said first and second members are gears.

4. The control system of claim 1, further including an operator input device connected to said processor for allowing an operator to select the members to be connected to and disconnected from the input or output of the transmission to operate the transmission in a plurality of speed ranges.

5. A control system for a continuously variable transmission having a plurality of force transfer members and, the control system comprising:

a plurality of mechanical clutches each associated with one or more members and each disposed for selectively connecting and disconnecting the associated member to an input or output of the transmission, a plurality of clutch actuators, each adapted to be connected to at least one of said clutches and each being operable for engaging and disengaging said one of said clutches for, respectively, connecting and disconnecting at least one of the members to the input or output of the transmission;

a first electrical motor/generator connected to a first member of the transmission and operable in a motor mode for controllably rotating the first member and in a generator mode controllably rotated by the first member to generate electrical energy, said first motor/generator having a speed adjustment significantly faster than that typical of a hydraulic pump/motor;

a second electrical motor/generator adapted to be connected to a second member of the transmission and operable in a motor mode for controllably rotating the second member and in a generator mode controllably rotated by the second member while generating electrical energy, said second motor/generator having a speed adjustment significantly faster than that typical of a hydraulic pump/motor;

a conductive path connecting said first and the second motor/generators;

a sensor for sensing a parameter representative of a rotational speed of the input or output of the transmission; and a processor operably connected to said sensor, said motor/generators and said clutch actuators, said processor being operable for operating one of said motor/generators in said generator mode while operating another of said motor/generators in said motor mode powered by said one of said motor/generators such that selected members of the transmission are rotated at adjustably controlled speeds corresponding to said sensed parameter for disconnecting one of the selected members from the input or output of the transmission and connecting another of the selected members to the input or output of the transmission, at least one of said mechanical clutches having an element matingly engageable disengageable with another element for engaging and disengaging said clutch, respectively.

6. The control system of claim 1, wherein the input or output of the transmission includes an output shaft of the transmission.

7. The control system of claim 1, wherein the motor/generator operated in the motor mode is operable for controlling a torque applied to the member to be disconnected from the input or output of the transmission and adjusting said torque significantly faster than the response time of a hydraulic pump/motor.

8. A control system for a continuously variable transmission, comprising:

a plurality of mechanical clutches a first clutch actuator connected to a first one of said mechanical clutches and disposed for selectively connecting a first member of the transmission to an input or output of the transmission, said first clutch actuator being operable for engaging said first clutch for connecting the first member to the input or output of the transmission and disengaging said first clutch for disconnecting the first member therefrom;

a second clutch actuator connected to a second one of said mechanical clutches disposed for selectively connecting a second member of the transmission to the input or output of the transmission, said second clutch actuator being operable for engaging said second clutch for connecting the second member to the input or output of the transmission and disengaging said second clutch for disconnecting the second member therefrom;

a first electrical motor/generator connected to one of the members of the transmission and operable in a motor mode for controllably rotating the member and in a generator mode controllably rotated by the member and to generate electrical energy;

a second electrical motor/generator connected to another member of the transmission and operable in a motor mode for controllably rotating the another member and in a generator mode controllably rotated by the another member and to generate electrical energy;

a conductive path connecting said first and second motor/generators;

a sensor for sensing a parameter representative of a rotational speed of the input or output of the transmission; and a processor operably connected to said sensor, said motor/generators and said clutch actuators, said processor being operable for operating one of said motor/generators in said generator mode while operating another of said motor/generators in said motor mode powered by said one of said motor/generators so as to rotate the first and second members of the transmission at speeds corresponding to said sensed parameter while operating said clutch actuators for engaging one of said mechanical clutches and disengaging another of said mechanical clutches.

9. A control system for a continuously variable transmission, comprising:

a first clutch actuator connected to a first mechanical clutch disposed for selectively connecting a first member of the transmission to an input or output of the transmission, said first clutch actuator being operable for engaging the first clutch for connecting the first member to the input or output of the transmission and disengaging the first clutch for disconnecting the first member therefrom;

a second clutch actuator connected to a second mechanical clutch disposed for selectively connecting a second member of the transmission to the input or output of the transmission, said second clutch actuator being operable for engaging the second clutch for connecting the second member to the input or output of the transmission and disengaging the second clutch for disconnecting the second member therefrom;

a first electrical motor/generator connected to one of the members of the transmission and operable in a motor mode for controllably rotating the one of the members and in a generator mode controllably rotated by the one the members to generate electrical energy;

a second electrical motor/generator connected to another of said members of the transmission and operable in a motor mode for controllably rotating the another one of said members and in a generator mode controllably rotated by the another member to generate electrical energy;

a conductive path connecting said first and second motor/generators;

a sensor for sensing a parameter representative of a rotational speed of the input or output of the transmission;

a processor operably connected to said sensor, said motor/generators and said clutch actuators, said processor being operable for operating one of said motor/generators in said generator mode while operating another of said motor/generators in said motor mode powered by said one of said motor/generators so as to rotate the first and second named members of the transmission at speeds corresponding to a value of said sensed parameter while operating said clutch actuators for engaging one of the clutches and for providing an engagement status signal to said processor for indicating when said one of said clutches is engaged and disengaging another of the clutches, responsive to said engagement status signal.

10. The control system of claim 8, further including a third clutch actuator adapted for connection to a third mechanical clutch disposed for selectively connecting a third member of the transmission to the input or output of the transmission, said third clutch actuator being operable for engaging the third clutch for connecting the third member to the input or output of the transmission and disengaging the third clutch for disconnecting the third member therefrom, and a fourth clutch actuator for a fourth mechanical clutch disposed for selectively connecting a fourth member of the transmission to the input or output of the transmission, said fourth clutch actuator being operable for engaging and disengaging the fourth clutch for, respectively, connecting and disconnecting the fourth member to the input or output of the transmission, said processor being operably connected to said third and fourth clutch actuators and operable for operating said one of said motor/generators in said generator mode while operating another of said motor/generators in said motor mode powered by the one of said motor/generators so as to rotate one or more selected the members of the transmission at speeds corresponding to said sensed parameter while operating at least one of the said clutch actuators for engaging one of the clutches and while operating at least one of said clutch actuators for disengaging another of the clutches.

11. The control system of claim 8, further including a third clutch actuator adapted for connection to a third clutch disposed for selectively connecting a third member of the transmission to the input or output of the transmission, said third clutch actuator being operable for engaging the third clutch for connecting the third member to the input or output of the transmission and for providing an engagement status signal to the processor for indicating when the third clutch is engaged and for disengaging the third clutch for disconnecting the third member from the input or output of the transmission, and a fourth clutch actuator for a fourth clutch disposed for selectively connecting a fourth member of the transmission to the input or output of the transmission, said fourth clutch actuator being operable for engaging the fourth clutch for connecting the fourth member to the input or output of the transmission and for providing an engagement status signal to said processor for indicating when the fourth clutch is engaged and for disengaging the fourth clutch for disconnecting the fourth member from the input or output of the transmission, said processor being operably connected to said third and fourth clutch actuators and operable for operating one of said motor/generators in said generator mode while operating another of said motor/generators in said motor mode powered by said one of the motor/generators so as to rotate one of the members of the transmission at speeds corresponding to said sensed parameter while operating at least one of said clutch actuators for engaging one of the clutches, and sensing and responding to engagement of said one of the clutches by disengaging another of the clutches to thereby synchronize the speed of selected ones of the members to facilitate the engagement and disengagement.

12. The control system of claim 8, further including an operator input device connected to said processor for allowing an operator to select the members to be connected to and disconnected from the input or output of the transmission.

13. The control system of claim 8, wherein said mechanical clutches each comprise a first element receivable in longitudinally movable into radial adjacency with and circumferentially engageable with a second element and longitudinally removable from said second element for engaging and disengaging the clutch, respectively.

14. The control system of claim 8, wherein said motor/generator operated in the motor mode is operable in response to a torque modification signal from said processor for controlling a torque applied to the member to be disconnected from the input or output of the transmission.

15. The control system of claim 14, wherein the processor is operable for signaling said motor/generator operated in the motor mode for dithering said torque for facilitating disconnecting the member.

16. The control system of claim 8, wherein said first and second clutch actuators are configured for association with first and second clutches which are, in turn, associated with first and second members of the transmission having different size gears mounted on the same member.

17. The control system of claim 8, wherein the input or output of the transmission includes an intermediate output shaft.

18. The control system of claim 8, wherein each of the motor/generators includes a rapidly responsive controller for controlling torque.

19. A method for operatively connecting components of a control system for a continuously variable transmission, comprising the steps of:

selectively connecting members of the transmission to an input or output of the transmission, utilizing a plurality of clutches adapted to be connected to a plurality of clutch actuators, the clutch actuators each being operable for respectively engaging a corresponding clutch for connecting the members to the input or output of the transmission and disengaging the clutches for disconnecting the members from the input or output of the transmission;

connecting a first electrical motor/generator to a first member of the transmission and operating said first motor/generator in a motor mode to controllably rotate the member and in a generator mode controllably rotated by the member to generate electrical energy;

adaptively connecting a second electrical motor/generator to a second member of the transmission and operating said second motor/generator in a motor mode for controllably rotating the another member and in a generator mode controllably rotated by the another member while generating electrical energy;

electrically connecting the first and the second motor/generators to a processor;

sensing a parameter representative of a rotational speed of the input or output of the transmission by using a sensor; and operably connecting a processor to the sensor, the motor/generators and the clutch actuators, operating one of the motor/generators in the generator mode under control of the processor while operating another of the motor/generators in the motor mode under control of the processor and powered by the one of the motor/generators such that selected of the members of the transmission rotate at rapidly adjustable controlled speeds corresponding to said sensed parameter, wherein said processor dithers the torque produced by said motor/generators to rapidly synchronize the speed of the selected members to facilitate connection of one of the selected members from the input or output of the transmission and to facilitate disconnection of another of the selected members to the input or output of the transmission.

20. The method of claim 19, further including a step of connecting an operator input device to the processor for allowing an operator to select the members to be connected to and disconnected from the input or output of the transmission.

21. The method of claim 19, wherein said step of engaging and disengaging at least one of said clutches includes the step of longitudinally moving a pair of mechanical clutch elements respectively into and out of mating radial adjacency.

22. The method of claim 19, further including a step of rapidly controlling a torque applied to the member to be connected or disconnected from the input or output of the transmission utilizing the motor/generator operated in the motor mode.

23. A method for operatively connecting components of a control system for a continuously variable transmission, comprising the steps of:

selectively connecting a first member of the transmission to an input or output of the transmission utilizing a first clutch actuator connected to a first clutch, the first clutch actuator being operable for engaging the first clutch for connecting the first member to the input or output of the transmission and disengaging the first clutch for disconnecting the first member therefrom;

selectively connecting a second member of the transmission to the input or output of the transmission utilizing a second clutch actuator connected to a second clutch, the second clutch actuator being operable for engaging the second clutch for connecting the second member to the input or output of the transmission and disengaging the second clutch for disconnecting the second member from the input or output;

connecting a first electrical motor/generator to at least one member of the transmission in a motor mode and controllably rotating the member and in a generator mode controllably rotated by the member to generate electrical energy;

connecting a second electrical motor/generator to another member of the transmission in a motor mode for controllably rotating the another member and in a generator mode controllably rotated by the another member to generate electrical energy;

establishing a signal path between the first and second motor/generators;

sensing a parameter representative of a rotational speed of the input or output of the transmission utilizing a sensor; and establishing a signal path connecting a processor to the sensor, the motor/generators and the clutch actuators, operating the processor to set one of the motor/generators in the generator mode and to set another of the motor/generators in the motor mode powered by the one of the motor/generators so as to rotate the first and second members at speeds corresponding to said sensed parameter while operating one of the clutch actuators to engage one of the clutches, and generating an engagement status signal to the processor when the one of the clutches is engaged and responsively to the receipt of said engagement status signal, sending a disengagement command signal from the processor to another one of the clutch actuator to disengage.

24. The control system of claim 8, wherein said mechanical clutches each comprise a first element longitudinally movable between a first position separated from a second element and a second position engaged with said second element.

25. The control system of claim 24, wherein said first and second elements are coaxial.

26. A control system for a transmission driven having primary force transfer members driven by an engine and two motor/generators, the control system comprising:

mechanical clutches for engaging and disengaging the members, and means for rapidly varying a speed of the motor/generators to dither said mechanical clutches during engagement and disengagement.

27. A method of controlling a transmission driven having primary force transfer members driven by an engine and two motor/generators, which comprises the steps of:

engaging selected ones of the force transfer members by use of a mechanical clutch, and electronically dithering a torque output of one of the motor/generators during said engagement.

* * * * *